Dec. 27, 1960 G. A. GIANNUZZI 2,966,114

DATA TRANSLATION AND PRINTING

Filed Dec. 30, 1958 9 Sheets-Sheet 1

INVENTOR.
George A. Giannuzzi
BY Melvin P. Williams
AGENT

Dec. 27, 1960 G. A. GIANNUZZI 2,966,114

DATA TRANSLATION AND PRINTING

Filed Dec. 30, 1958 9 Sheets-Sheet 2

Dec. 27, 1960 G. A. GIANNUZZI 2,966,114

DATA TRANSLATION AND PRINTING

Filed Dec. 30, 1958 9 Sheets-Sheet 4

Dec. 27, 1960 G. A. GIANNUZZI 2,966,114

DATA TRANSLATION AND PRINTING

Filed Dec. 30, 1958 9 Sheets-Sheet 5

Dec. 27, 1960 G. A. GIANNUZZI 2,966,114

DATA TRANSLATION AND PRINTING

Filed Dec. 30, 1958 9 Sheets-Sheet 6

Dec. 27, 1960 G. A. GIANNUZZI 2,966,114

DATA TRANSLATION AND PRINTING

Filed Dec. 30, 1958 9 Sheets-Sheet 7

Dec. 27, 1960 G. A. GIANNUZZI 2,966,114

DATA TRANSLATION AND PRINTING

Filed Dec. 30, 1958 9 Sheets-Sheet 8

Dec. 27, 1960 G. A. GIANNUZZI 2,966,114

DATA TRANSLATION AND PRINTING

Filed Dec. 30, 1958 9 Sheets-Sheet 9

United States Patent Office 2,966,114

Patented Dec. 27, 1960

2,966,114

DATA TRANSLATION AND PRINTING

George A. Giannuzzi, Vestal, N.Y., assignor to International Business Machines Corporation, New York, N.Y., a corporation of New York Filed Dec. 30, 1958, Ser. No. 783,779

20 Claims. (Cl. 101—93)

This invention relates to data processing, and more particularly to correlating the time function of data manifestations with timed operations performed in response to said manifestations.

In the utilization of record controlled business or calculating machines, it is frequently desirable, for example, to print a controlling record according to the control indicia thereon, the process being known in the art as "interpreting." Prior printing devices of this sort frequently employ a plurality of type-carrying members, each of which carries a complete array of type selectable for printing. Such devices require time for selecting the particular character to be printed, and may have a relatively high mass; the setup time requirements and inertia problems of such devices generally limit them to relatively low speed applications. For printing records at high speed and more particularly for printing records while in flight, a faster means for printing than that shown in the prior art is required.

Therefore, it is a primary object of this invention to provide a simple, low inertia printer which does not require much time for selecting the character to be printed. A further object is to provide a higher speed printer which is compatible with printing on a continuously moving record.

A main feature of this invention is the adaptation of random printing means for printing a record while it is moving at high speed with a minimum of type selection time required. In one embodiment adapted for printing a single line of characters, the invention utilizes a single row of type placed along the line on which the record is to be printed, there being one character-bearing type bar, similar to those used in typewriters, for each character selectable to be printed. Any of the possible characters can be printed in any of the printable positions on the record; as the record continuously moves longitudinally past the row of type bars, a signal indicating that a particular character is to be printed will actuate the related type bar at the exact time that the print position in which that particular character is to print is moving past that type bar. In order to reduce the amount of mechanism employed and to increase the card rate of printing, it is desirable to use the shortest possible operational card feeding path, and also to control printing as directly as possible from the record sensing means.

It is another object of this invention to provide a simple record card printer in which printing can begin before data sensing is completed.

In the preferred embodiment of this invention, printing of a record card is effected along a line parallel with the motion of the card as it is being sensed; the printing of certain ones of the characters can occur while the card is still being sensed, the sensing and printing means being adjacently arranged in tandem along the card path. The spacing of the printed characters is a function of the speed at which the card passes the type members and the frequency of type bar operation. Since the card moves past the sensing means at the same speed at which it moves past the printing means, direct printing would result in having the characters spaced the same as the control data indicia which are uniformly distributed on the card. In standard record cards, the data spacing may not be correct for printed characters. For instance, the well-known IBM card has eighty columns of twelve index point positions; the spacing of the columns (about .088 inch) is too close for printed characters in many applications; the spacing of the index points (about .25 inch) is too wide for most printing applications. The readability and aesthetic appearance of type printed on a record card is improved by having the printed characters clustered together at an intermediate spacing, for instance at intervals of about two tenths of an inch. Thus printing would have to be done at a lower rate than sensing when reading the card column by column and printing in a row parallel to the long dimension of the card (called "interpreting"); similarly, the printer would need to be operated at a higher frequency when sensing the index point positions digit by digit and printing across the end of the card (called "end-printing").

Wherefore it is another object of this invention to provide in a data processing machine, a subcycle point conversion device of general utility.

Prior cycle point conversion devices are limited to converting data to a frequency lower than the sensing frequency, require elaborate storage and timing mechanism, or are limited to handling a single data bit per alternate machine cycle, requiring double mechanism operated in push-pull.

A further object of this invention is the provision of a simple subcycle conversion device which requires no more delay than that inherently necessary for conversion. Another object is to provide such a device which can convert data to a frequency higher than that of the input data. Still another object is to provide a cycle point converting device which can receive subsequent data bits while storing other data bits and subsequently read out the several bits in proper timed sequence.

In order to clarify the several features of this invention, a cycle point converter that converts to a frequency higher than that at which data is sensed is shown in the environment of a record printer which senses record card data digit by digit and which random prints along a short edge of the record cards.

For reliability checking, record card columns which are to remain blank are frequently punched with redundant zeros, the printing of which is generally not desired; therefore, there is provided herein an electrical means for suppressing non-significant zeros in a manner which is compatible with random printing and cycle point conversion.

Other objects of the invention will be pointed out in the following description and claims and illustrated in the accompanying drawings, which disclose, by way of example, the principle of the invention and the best mode which has been contemplated of applying that principle.

CONTENTS

Figure 1:
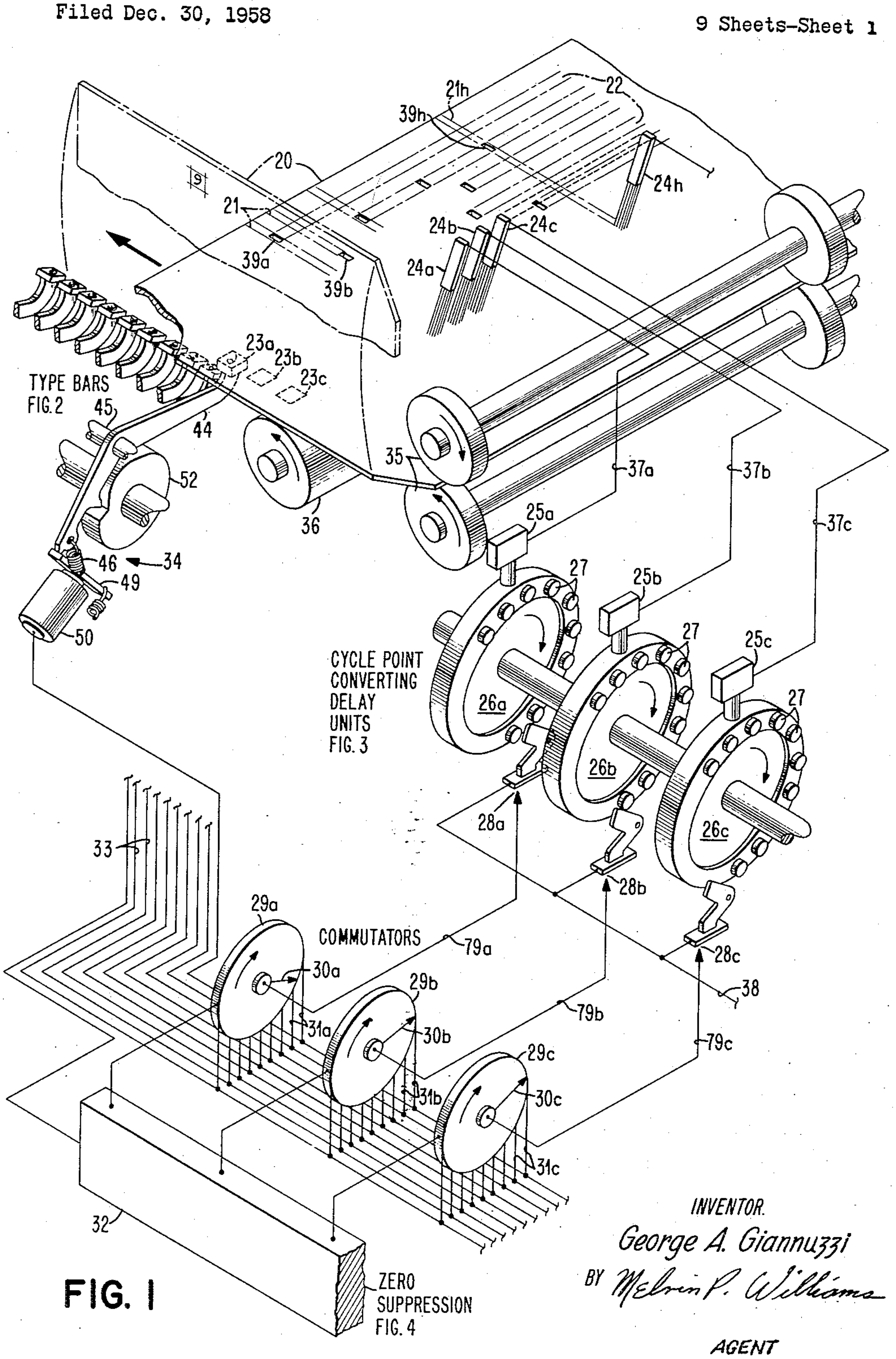
Fig. 1 is a simplified semi-schematic diagram of a device for random end printing of a record card with cycle point conversion.
Figure 2:
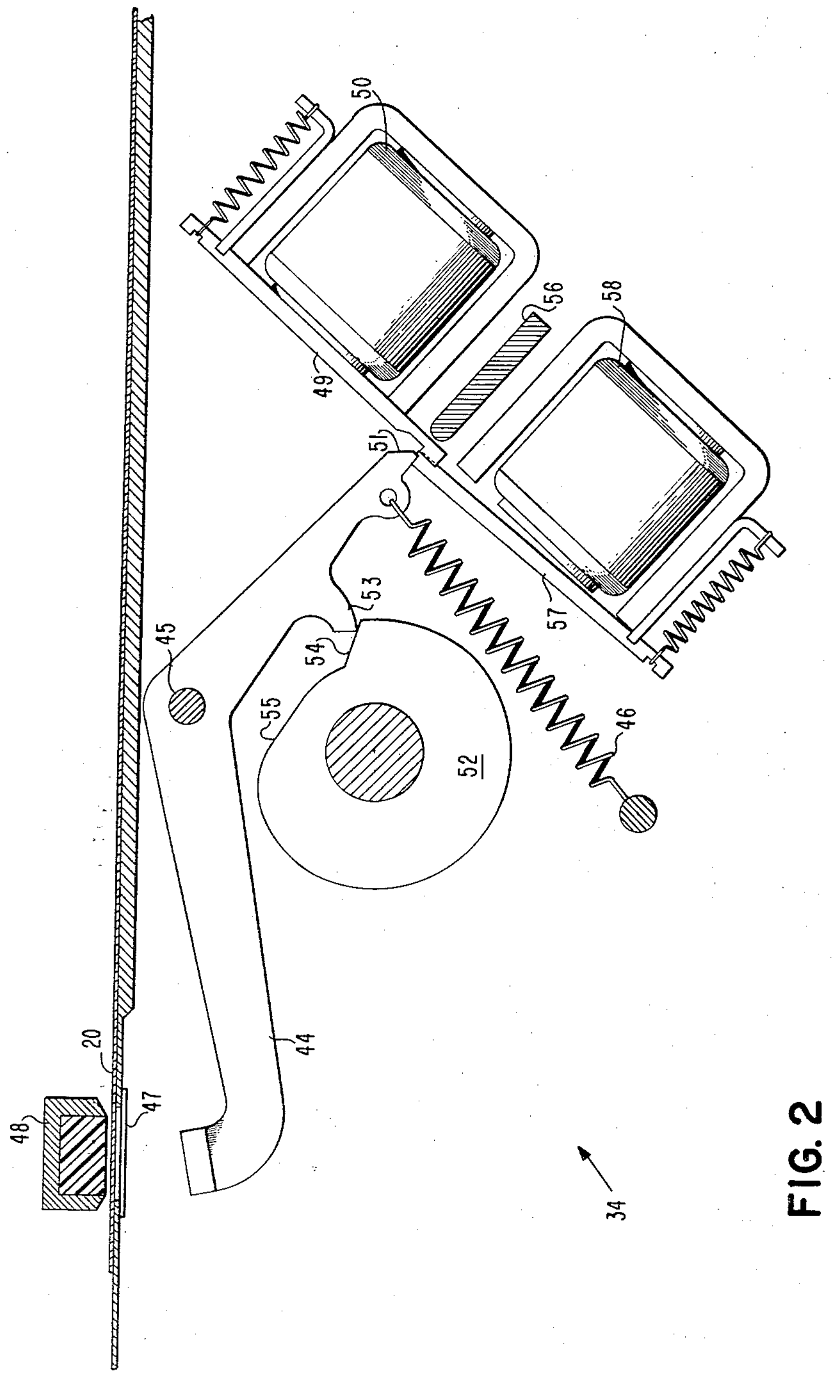
Fig. 2 is a side elevation of a type bar and type bar operating means adapted for the random printing devices of Fig. 1 and Fig. 6.
Figure 3:
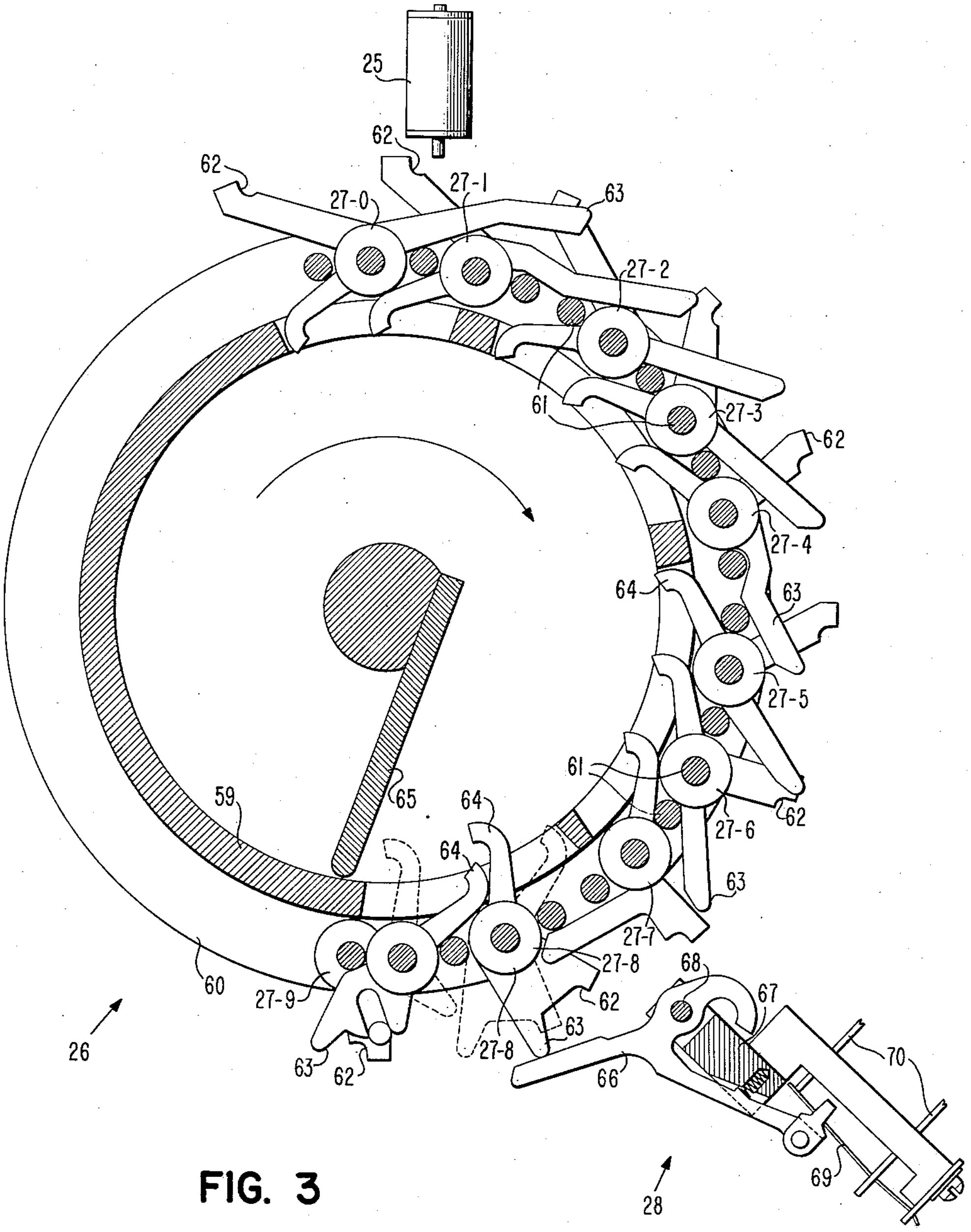
Fig. 3 is a transverse section of a cycle point converting rotary delay device suitable for use in the random printing device of Fig. 1.
Figure 4:
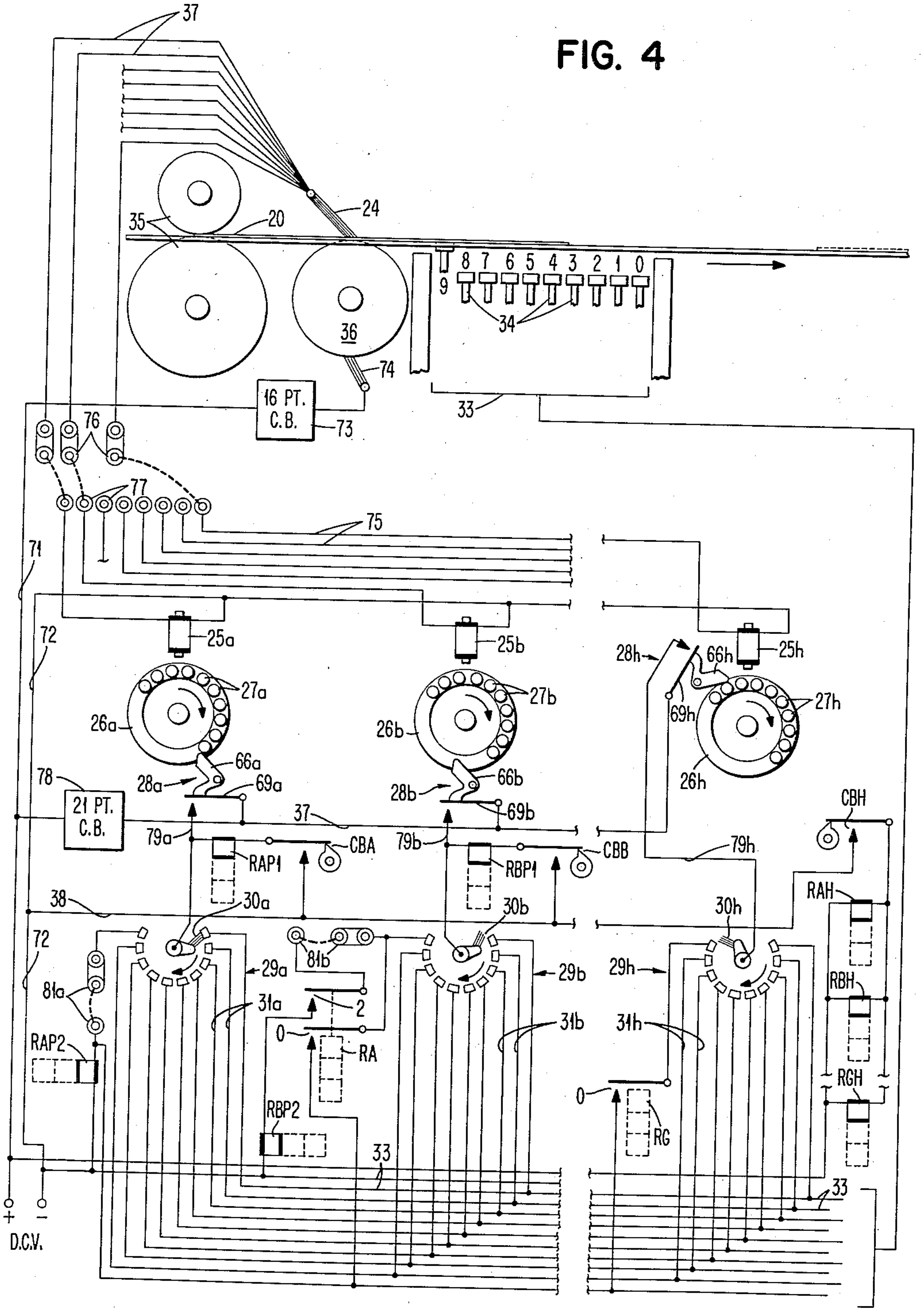
Fig. 4 is a schematic diagram of the control circuitry for the device shown in Figs. 1–3.
Figure 5:
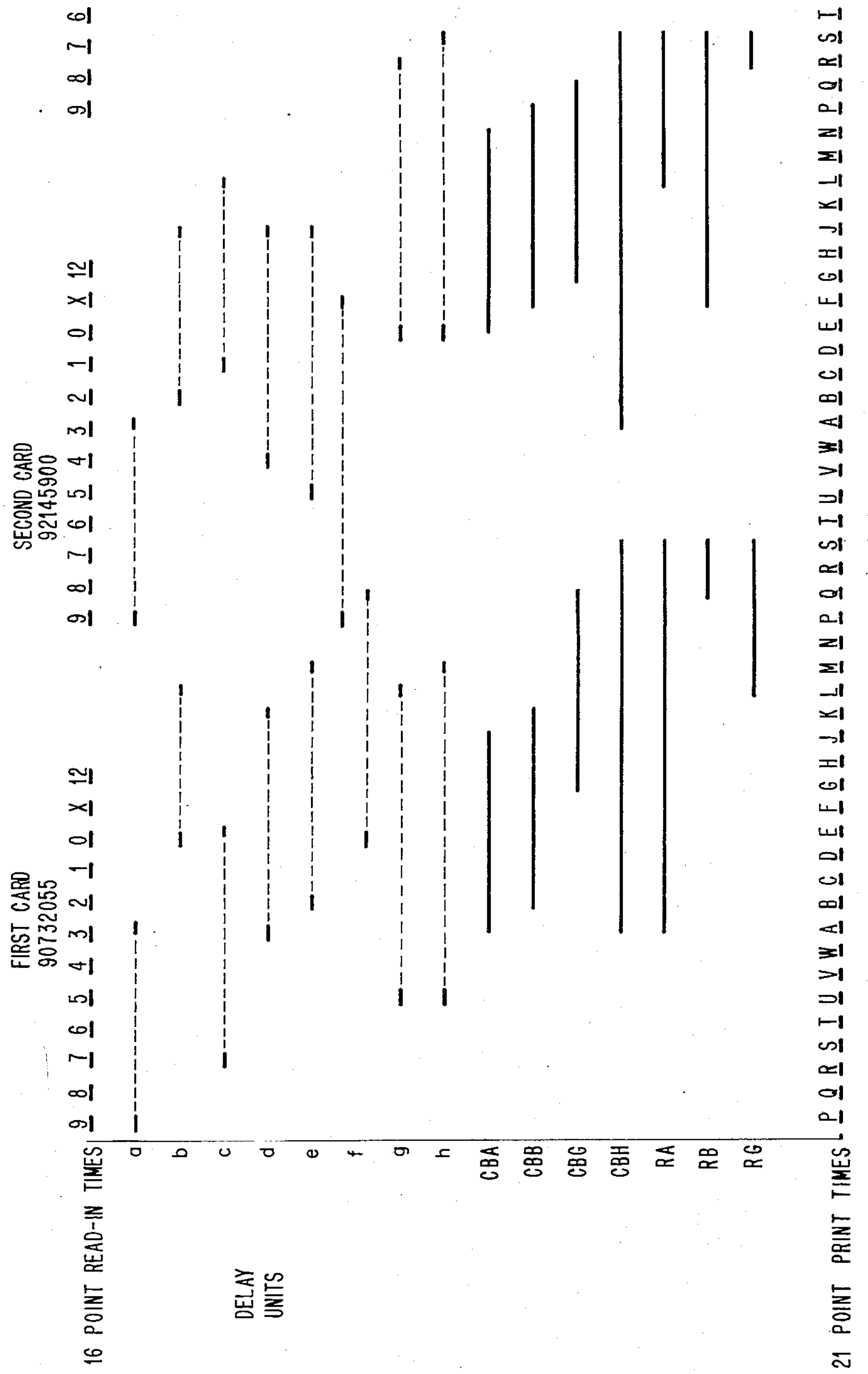
Fig. 5 is a timing diagram of the device shown in Figs. 1–4.
Figure 6:
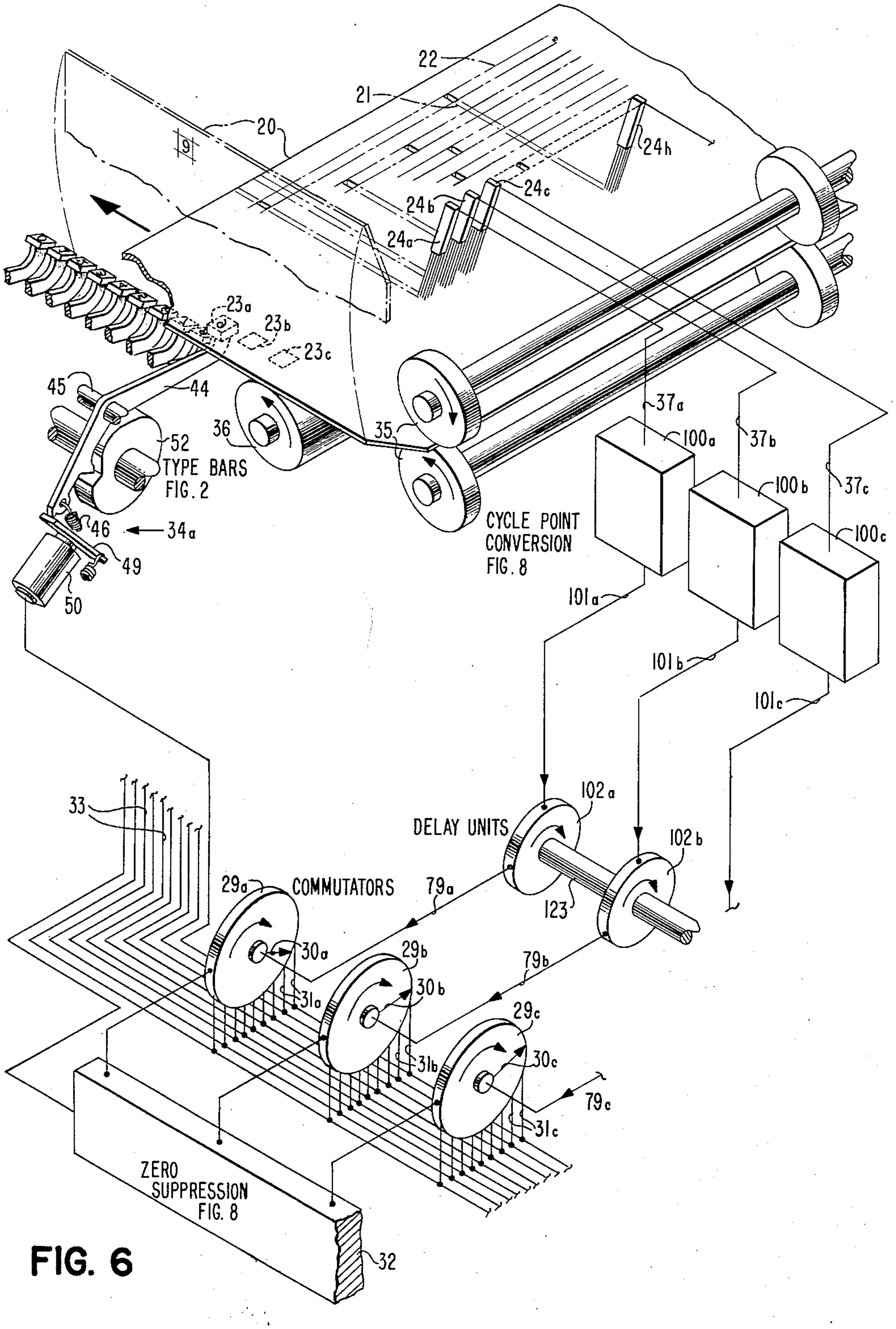
Fig. 6 is a simplified semi-schematic diagram of an alternative device for random end printing of a record card with cycle point conversion.
Figure 7A:
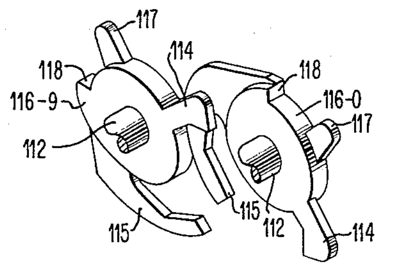
Fig. 7 is a partially sectioned elevation of a non-cycle point converting rotary delay device suitable for use in the random printing device of Fig. 1.
Figure 7:
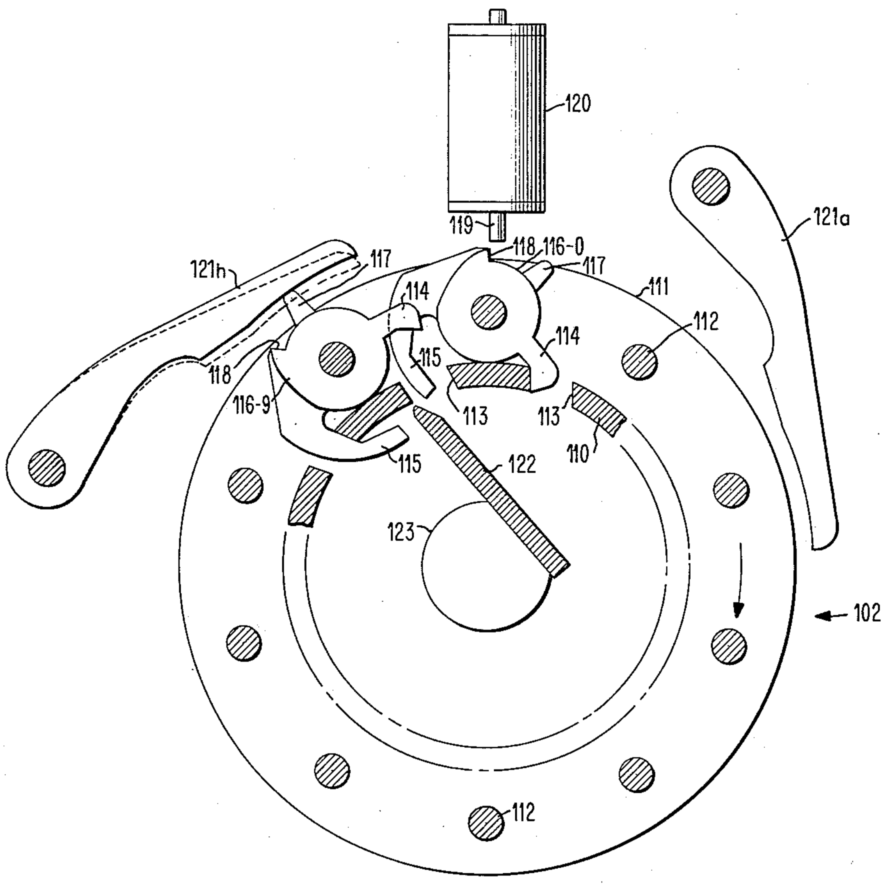
Figure 8:
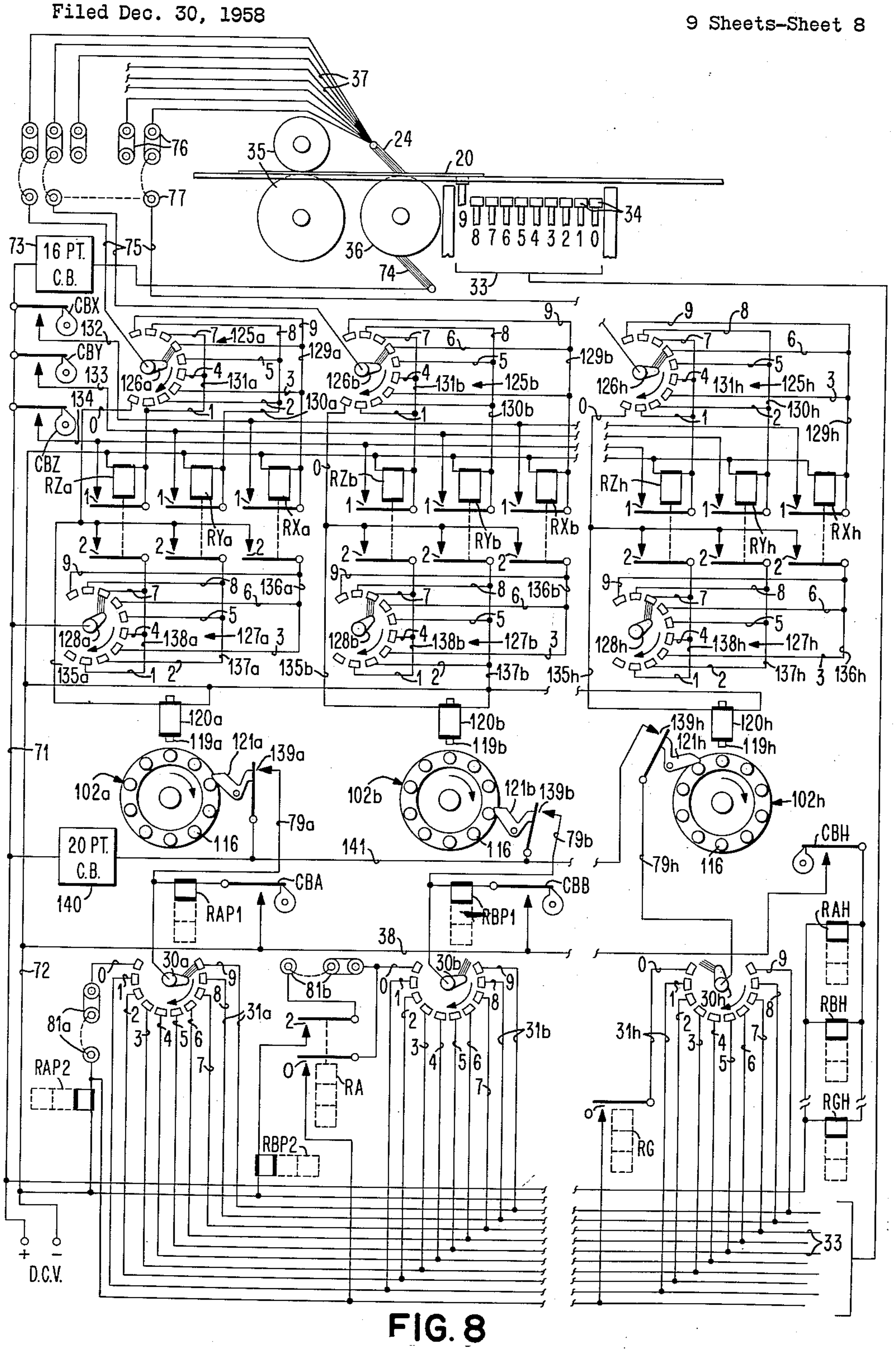
Fig. 8 is a schematic diagram of an electrical circuit that provides control and cycle point conversion for the device of Figs. 6 and 7.
Figure 9:
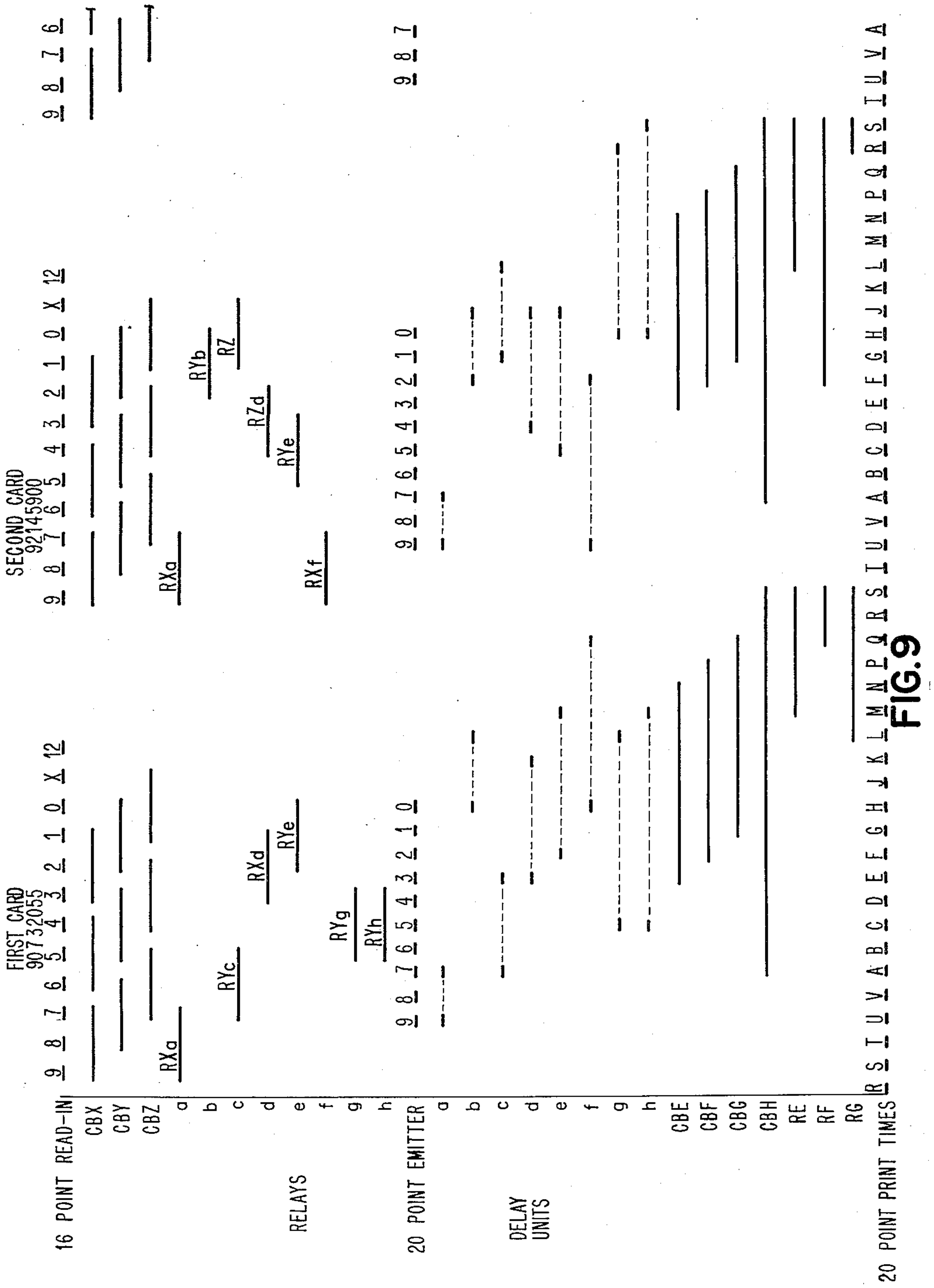
Fig. 9 is a timing diagram for the device of Figs. 6, 7 and 8.

End printer with cycle point converting delay device ---------- Fig. 1
Type bars ---------- Fig. 2
Cycle point converting delay device ---------- Fig. 3
Operation and timing ---------- Figs. 4 and 5
Brief description of end printer with electric cycle point conversion ---------- Fig. 6
Non-converting delay device ---------- Fig. 7
Operation and timing with electric cycle point conversion ---------- Figs. 8 and 9
Interpreting
Summary

*End printer with cycle point converting delay device*

One embodiment of the invention will now be briefly described with reference to Fig. 1. A record card 20 of the well-known IBM type has 80 columns 21 of 12 index point positions. The index point positions are aligned in rows 22; each row corresponds to a digit value or a control value. The digit rows are parallel to the long dimension of the card and are arranged from one long edge to the other in the following order: 9, 8, 7, . . . 2, 1, 0, X, 12. The "0" may be used to represent a control value with the "X" and the "12", as well as to denote the numeral "zero"; in this embodiment, the "0" is used as a numeral. The record card 20 is fed face down, "9" edge first by a pair of feed rollers 35 (from right to left in Fig. 1). The rows of index point positions 22 pass beneath each of eight brushes 24 in the following order: 9, 8, 7, . . . 2, 1, 0. Each brush 24*a*, 24*b*, . . . 24*h* senses the holes 39 in a corresponding one of eight columns 21*a*, 21*b*, . . . 21*h*, and the data sensed is printed on the card in corresponding print positions 23*a*, 23*b*, . . . 23*h*. Individual "type bars" 44, each having a single character similar to those used in typewriters, are arranged in a row parallel to the card motion so that the print positions 23 move successively past each type bar in sequence; the "9" type bar is passed first, then the "8," and the "0" is passed last; the highest ordered print position 23*a* passes the type first, and the lowest order print position 23*h* passes the type last. Thus each print position is presented in succession to successively lower numbered type bars; selection of type may therefore be made by swinging the correct type bar at a time when the position to be printed with the corresponding character is passing over that type bar. Since the order in which the various print positions will be printed is determined by which character is to be printed thereon, the order varies from card to card; this form of type operation is called "random printing."

Some sort of conducting medium is needed to sense the passing of a brush 24 through a hole 39. It has long been standard to provide a brush contact roller 36, rotating synchronously with the feed rolls 35 for contact with the brushes; longer life and more reliable operation are achieved in that way. To preserve the advantages of individual brushes 24 and a common roller 36, it is necessary to arrange the brushes for the several columns in a row perpendicular to card motion; this results in all digits of the same value (for instance all "9's" or all "2's") being sensed simultaneously in each of the columns. Without considering the exact spacing of printed characters, the highest order print position 23*a* could be printed directly from the corresponding brush 24*a*, since the data is sensed by the brushes in the same order as that in which printing takes place. However, since the successively lower ordered print positions appear above each type bar one additional print-time later, there must be introduced one additional print-time of delay for each order lower in the sequence of print positions in which the corresponding print position is disposed. That is, position 23*b* is one print-time delayed, position 23*c* is two print-times delayed, . . . position 23*h* is seven print-times delayed. Furthermore, some time delay is required to move the card from the place where the brushes are located to a place where there is sufficient mechanical space to locate the printing mechanism. This space is not critical and can be varied to suit design expediency. The two types of delay just mentioned are achieved in this embodiment in conjunction with cycle point conversion.

In Fig. 1, the sensing of holes 39 by the brushes 24 results in an electric pulse passing from the brush roller 36 through the brush to a wire 37, which carries the pulse to a magnet 25 of a corresponding one of the "cycle point converting delay units" 26. The delay units 26 are rotating synchronously with the feed rolls 35, and each has ten elements 27 respectively corresponding to the ten numerals "9" through "0." The elements (described in detail hereinafter) pass beneath the magnet 25 on a 16-point basis, that is, one sixteenth of a revolution apart. The elements are shaped to selectively close corresponding readout contacts 28 some time later, on a 21-point basis. The magnet 25 is energized at a time (that is, 9-time or 6-time, etc.) determined by the hole punched in the corresponding column of the card, and when energized, the element 27 corresponding to the same digit (27–9 or 27–6, etc.) will be passing the magnet and will be moved thereby; only elements 27 so moved will close the readout contacts 28. Cycle point conversion is effected by reading into the delay unit (by magnet 25) on a 16-point basis and reading out on a 21-point basis; the fixed delay for mechanical space allowance is effected by having the readout contacts all spaced some portion of a revolution around from the magnet; the random printing delay that accounts for the later times at which lower ordered print positions appear over the type is effected by having additional spacing equivalent to one element between the successively lower ordered readout contacts 28*b*, 28*c* . . . 28*h* and the respectively corresponding magnets 25*b*, 25*c* . . . 25*h*.

Closing of a readout contact 28 momentarily connects a power line 38 with a corresponding readout line 79. A pulse thereby is delivered by line 79 to a rotor 30 of a corresponding commutator 29 at the time that the digit read by the related brush 24 can be printed in the print position 23 corresponding to the column in which the digit was read. The rotors 30 are each rotating synchronously with the same respective delay relationship as the corresponding delay units: rotor 30*b* is one stator element delayed from rotor 30*a*, rotor 30*c* is one stator element behind rotor 30*b* and two stator elements delayed from rotor 30*a*, etc. Each commutator 29 serves to recognize the digit that corresponds to a pulse appearing at a particular time in its own column. The pulses sorted by digit-value in that way are transmitted by the several sets of commutator output wires 31 onto the common print magnet wires 33. All of the stator-segments corresponding to the same digit (for instance, all 9-stators, all 6-stators) are connected by lines 31 and lines 33 to a print magnet 50 for operating the corresponding one of the type bars 44 (for instance, the 9-bar, the 6-bar).

In summation, the holes 39 in the card 20 are read digit-by-digit in several columns (*a*, *b*, . . . *h*). The digit pulses energize magnets 25 which move corresponding ones of the several sets of revolving elements 27. The elements 27 later close corresponding contacts 28, the delay being determined by the space between the contacts 28 and magnets 25 around the path of the elements 27. Each of the contacts 28 is spaced some fixed amount from its magnet 25, and the spacing increases in each successively lower ordered column. The pulse outputs are sorted by digit at the commutators 29 which thereby convert the digit pulses in the several columns, the digit values of which are known by the time of appearance, to pulses translating to the several type bars, the column relation of which is determined by the time of appearance. Shown at the bottom of Fig. 1, the "zero suppression" circuits pass to the print magnets only significant zeros; zeros punched in a card for checking purposes are blocked, and do not print. The details of the several parts and the timing of the end-printer are presented more fully in succeeding sections.

*Type bars*

The type bars are similar to those used in typewriters; each bar bears one character, and character selection is effected by selecting the corresponding type bar. The type bars are constantly urged toward the platen, but each is restrained by a common camming surface and an individual latch. To print, the corresponding latch is released, and when the camming surface rotates synchronously with the card feed to the correct position, a spring causes the type bar to fly toward the platen with a motion controlled by the cam surface. Specifically, Fig. 2 shows the type bar operating mechanism which comprises the type bar 44 adapted to be rotated by a spring 46 on a pivot 45 so as to strike a ribbon 47 and thereby impress the card 20 against a stationary platen 48 which is disposed on the opposite side of the card from the ribbon 47. The type bar 44 is prevented from rotating under the force of the spring 46 by an armature 49 of a magnet 50 disposed so as to interfere with an extension 51 of the type bar 44. In order to synchronize motion of the type with the motion of the card past the platen, a cam 52, synchronously rotating with the card feed, interferes with a finger 53 on each type bar so as to permit rotation of the type bar, and thereby effect a character impression, only when a print position on the card is centered with the platen. The dropping portion 54 of the cam surface is such as to allow rapid rotation of the type bar, and the rising portion of the cam surface 55 is designed so as to minimize type bar bouncing and the shadow printing effect which would result therefrom. As shown, the magnet 50 has been energized, and the type bar has begun its swing to print a character. Also shown in Fig. 2 is a restoring bail 56 which is operated (by mechanism not shown) to restore the armature 49 to the latched position with respect to the type bar extension 51. This bail is operated synchronously with the cam 52 and the card feed so as to relatch each type bar at the end portion of every printing subcycle. In order to save mechanical space, alternate type bars have their latch magnet assemblies placed on opposite sides, as shown by the armature 57 and magnet 58 (shown not energized). The restoring bail is common to all of the magnet armatures 49, 57, etc.

In operation, the coil of the magnet 50 is energized by a pulse from the commutator 29 (Fig. 1) of the column relating to the position 23 in which printing is to occur; the finger 53 is then in contact with the high surface of the cam, but immediately thereafter, the dropping surface 54 and the finger 53 permit the spring 46 to rock the type bar 44 for making the impression, and thereafter the rising portion 55 and the finger 53 return the type bar to its rest position. Since the magnet pulse has passed, the extension 51 is then in a position to allow the reset bail 56 to push the armature 49 back into the latched position (in which the armature 57 is shown). If the type bar is not to print in a subsequent print subcycle, the latch will hold the type bar inoperative while the low point 54, 55 on the cam 52 passes by the finger 53.

*Cycle point converting delay device*

In a previous section, the general function of the "cycle point converting delay units" was discussed. These units are all rotating together, and may be built up on flange sections of a single cylindrical unit. Referring now to Fig. 3, a continuously rotating hollow cylinder 59 has nine flanges 60 disposed equally along its length. A plurality of rods 61 of the same length as the cylinder 59 pass through all of the flanges 60 and serve either as pivots or stops for the ten elements 27. The elements 27 comprise pawls, each having an interposing arm 62, a switch rocking arm 63, and a reset arm 64. Each delay unit comprises ten pawls 27 disposed between two of the flanges 60 so that each pawl is rotatable on one of the rods 61. Shown at the top of Fig. 3 is the magnet 25 disposed so that when energized, its armature moves into the path of the interposing arms 62 of the pawls 27. At the bottom of Fig. 3 is shown the readout contact 28 which comprises a rocker 66 pivotally mounted to a frame 67 by a pin 68 and adapted to be rotated by the switch rocking arms 63 so as to bend the wire contact 69 (as shown) and thereby complete the circuit between the posts 70. Within the cylinder 59 is a stationary reset blade 65 of the same length as the cylinder 59; the blade 65 is disposed so as to be in the paths of the reset arms 64 on rotated pawls, and serves to re-rotate, or reset all of the pawls.

In operation, the magnet 25 is energized by a digit pulse from the brush 24, and the armature moves into the paths of the interposing arms 63. The delay unit assembly is continuously rotating in synchronism with the card feed and is timed so that the interposing shoulder of the pawl corresponding to each digit approaches the point of contact with the magnet armature at the time that the hole representing that digit is sensed by the brushes. Contact between the armature and the arm 62 forms a torque couple with the corresponding pivot rod 61, which rotates the pawl counterclockwise about the rod; the "1" pawl 27–1 is shown approaching the point where contact with the armature would occur if the magnet were energized; the "8" pawl 27–8 is shown in the rotated position. The pawl rotated by the magnet will continue to revolve in the rotated position until it contacts the reset blade 65; when the pawl arm 64 strikes the blade, the blade and the corresponding pivot rod 61 form a clockwise couple to re-rotate the pawl into its reset position. Prior to contacting the blade, the pawl revolves past the readout contact 28, and the switch rocking arm 63 strikes the rocker 66 and moves it slightly counterclockwise so as to close the contacts 69, 70. In this embodiment, the shapes of the various pawls have been chosen to convert from 16 to 21 cycle points. This is accomplished by having the interposing arm 62 spaced $\frac{1}{16}$ of a revolution apart (so that the delay unit input is on a 16-point basis) and having the switch rocking arms 63 spaced $\frac{1}{21}$ of a revolution apart (so as to read out on a 21-point basis). Note that the space between the interposing arm and the switch rocking arm of successively lower numbered pawls is greater; the "0" pawl 27–0 closes the readout switch sooner after magnet operation than does the "8" pawl 27–8. All of the pawls are of a similar one-piece construction except for the "9" pawl 27–9; the switch rocking arm 63 of the "9" pawl must rotate into essentially the rest position of the interposing arm 62, and must also rotate into a position sufficiently radially outward from the flange 60 to operate the switch rocker arm 66; the two piece construction shown satisfies both requirements. This device can be adapted for cycle point conversion at any ratio, including conversion to a lesser number of cycle points, merely by altering the shapes of the respective pawls 27 so that the interposing arm 62 appear beneath the magnet 25 at the input frequency, and the several switch rocking arms 63 pass the rocker 66 at the desired output frequency, considering the pawls to be rotated.

The heretofore described cycle point conversion device relies on the successive differently shaped pawls for each digit value to convert from 16-point read-in to 21-point readout. This conversion can take place using a similar delay unit in which each pawl is the same shape as every other pawl by accounting for the difference in read-in and read-out timing. One alternative way of accomplishing this is to rotate the interposing magnet 25 clockwise in Fig. 3 during read-in time, the pawls being shaped and spaced on the delay unit so as to have both their interposing arms 62 and their switch rocking arms 63 spaced one twenty-first of a revolution apart. The relative motion between the interposing magnet 25 and the interposing arms 62 would therefore be less, giving rise to a slower (16-point) frequency of input. In this case the readout switch could remain stationary, and the possibility of said switch being closed by one of the switch rocking arms 63 would occur on a 21-point basis. Another modification of essentially this same idea could be achieved by having the pawls on the delay unit shaped and arranged so that their respective interposing and switch rocking arms would be 1/16 of a revolution apart. In this case the interposing magnet 25 would remain stationary, but the readout contact 28 would have to be rocked counterclockwise during readout time, so as to increase the relative motion between the switch operating arms 63 and the readout contact arms 66, thereby increasing the possible readout frequency.

*Operation and timing*

A schematic diagram of the end printer with cycle point conversion is shown in Fig. 4, and will be described with reference also to Figs. 1, 3 and 5; some explanation of Figs. 4 and 5 will be given first.

At the top of Fig. 5, the numbers assumed to be punched in two successive cards are shown to be "90732055" and "92145900." The first line of pulses, "16-point read-in times," illustrates the pulses supplied by a 16-point circuit breaker 73 (Fig. 4) to the brush roller 36; these pulses are identified by the digit values that would be sensed by the brushes at the times indicated. The lines *a*, *b*, . . . *h* represent the action of the "Delay Units": the first solid dash, coincident with a digit pulse, represents read-in by the magnet 25; the light dashed lines represent the time during which a rotated pawl revolves toward the readout contact 28; the solid dash at the end of the pawl revolving time indicates the closing of the readout contacts, which sends a pulse to directly cause printing. The readout and printing times, "21-point print times," are identified as arbitrary print times "A" through "W." Also shown are the closed times of circuit breakers (CBA, etc.) and relays (RA, etc.) which will be introduced in the following description. Fig. 4 shows three of the eight columns contemplated in this embodiment; the columns not shown (*c*, *d*, *e*, *f*, and *g*) are identical in structure to column "*b*," but have successively increased delays therein.

Referring to the top of Fig. 4, the record card 20 is moved toward the right by the feed rolls 35 so that the holes 39 punched therein will selectively permit the brushes 24 to contact the brush roller 36. A 16-point circuit breaker 73 supplies pulses through a common brush 74 to the brush roller 36; when a hole passes beneath a brush, a pulse is sent along a wire 37 to a respective brush hub 76, thence by plug wire to a print hub 77, and through a corresponding line 75 to the related magnet 25. This pulse is that one of the pulses (shown as "16-point read-in times" in Fig. 5) which corresponds to the digit row 22 ("9" through "0") in which the hole was punched. At this time, the pawl 27 corresponding to that digit is approaching the point of contact with the armature of the magnet 25. The armature moves down, and the pawl rotates; this is illustrated by the first heavy dash line in any one of the "delay unit" lines of Fig. 5, the light dashes thereafter showing the time in which the rotated pawl 27 revolves on the delay unit 26 toward the readout contact 28. The readout contact 28 is closed (indicated by the final heavy dash in Fig. 5) when the switch rocking arm 63 of the pawl contacts the rocker 66. A 21-point circuit breaker 78 supplies pulses to the readout contact 28 at the times indicated as "21-point print times." The pulse selectively passed through the readout contact 28 is carried by a line 79 to the rotor 30 of a commutator 29 for distribution onto the correct one of the print magnet wires 33 by way of the corresponding one of the commutator output wires 31, as heretofore described. This same pulse also operates the zero suppression circuits to permit zeros to pass in lower order columns, in a manner to be now described.

The zero suppression circuits are designated to print every zero, to print only significant zeros, or to split the printing field into two groups of numbers in which zero suppression can be had or zero printing can be had in either or both of the groups of numbers independently. The mode of operation of the zero suppression circuit is to block every zero normally and to close contacts that will permit the passage of a zero pulse to the zero type bar magnet under specific operating conditions. In the highest order column, column "*a*," a zero can never be significant, and the only way a zero can print is for it to be connected through the zero suppression hub 81*a* so as to print a zero whenever a zero is read out through the readout contacts 28*a*. Each of the succeeding lower order volumns ("*b*," "*c*," . . . "*h*") can print zeros only through a contact of a preceding zero suppression relay. Except in column "*a*," this printing of zeros is selectable only at the preceding column hub 81; that is, only if the zero suppression relay has been energized will the zero in a particular column print. The circuit breakers CBA, CBB, . . . CBG are each closed only during the time in which any digit "1" through "9" may be passed through the corresponding readout contacts 28*a*, 28*b*, . . . 28*h*; this ensures that the number one pick coils RAP1, RBP1, . . . RGP1 will be energized only if a significant digit is to be printed. Once energized, the zero suppress relays are held operative by respective hold coils RAH, RBH, . . . RGH, which are energized by a holding coil circuit breaker CBH until such time as any possible zeros have had time to pass. For simplicity, the relays RA, RB, . . . RH are defined to be of the type which has one or two pick coils (RAP1, RAP2, etc.) of sufficient magnetic strength to move the relay armature, and having a hold coil (RAH, etc.) of only enough strength to maintain the contacts in the closed position, and not enough strength to initially close the contacts by swinging the armature.

Considering the first card shown in Fig. 5, the first digit sensed is the "9" in column "*a*," which causes a pulse from the brush 24*a* to energize the magnet 25*a* at the time that the "9" pawl 27–9 is revolving on the delay unit 26*a* beneath the armature. Contact of the interposing arm 62 with the magnet armature rotates the pawl 27–9; this occurs at "9" time. The rotated pawl continues revolving and its switch rocking arm 63 closes the readout switch at A-time, immediately passing a pulse from the 21-point circuit breaker 78 through the rotor 30*a*, which is passing the 9-stator of the commutator 29*a*, over the 9-wire 31*a* to the 9-wire 33 so as to energize the print magnet 50 (Fig. 1) of the "9" type bar bar 44. At the same time, the pulse energizes the number one pick coil RAP1 of the column "*a*" zero suppress relay RA through the column "*a*" relay circuit breaker CBA which is energized only during the time that a significant digit ("9" through "1") can pass through the readout contact 28*a*, which is from A-time though J-time. Since only one pulse per cycle can pass through each column, it is possible to hold all of the zero suppress relays until the end of each cycle. Therefore, all hold coils RAH, RBH, . . . RGH can be energized through the same circuit breaker CBH until the lowest order zero can print, which is at S-time, as more fully described hereinafter. After the "9" is sensed in column "*a*," other digits are sensed in order: "7" in column "*c*," "5" in columns "*g*" and "*h*," "3," in column "d," "2" in column "e," and "0" in columns "b" and "f." When the "0" is sensed in column "b," the pulse energizes the magnet 25b as the pawl 27–0 approaches the armature of the magnet, and the pawl 28–0 is then rotated; this is shown at 0-time in Fig. 5. The pawl continues to revolve on the delay unit, and the readout contact 28b is closed at L-time, sending a pulse from the 21-point circuit breaker 78 onto the line 79b and to the rotor 30b as it passes the 0-stator segment of the commutator 29b. The "0" passes down the 0-line 31b, through the 0-contact of the column "a" zero suppress relay RA, which is being held closed by the hold coil RAH and the hold circuit breaker CBH. Thus, the "9" in column "a" sets up RA so that the "0" in column "b" can print. The "0" pulse from the delay unit 29b also goes to the number one pick coil RBP1 of the column "b" zero suppress relay RB, but since the circuit breaker CBB is closed only during the time that a significant digit can read out of the column "b" delay unit 29b, from B-time through K-time, the "0" pulse (at L-time) cannot find a return circuit to ground, and RBP1 is therefore not energized. However, assuming the zero suppress hubs 81b to be connected through control panel wiring, the pulse passing through the 0-stator of the commutator 29b will not only cause printing, but will also pass through the 2-contact of RA and energize RBP2, so that a zero can print in the following column.

As illustrated above, a zero may print in a column if a significant digit appears in the next higher order column so as to energize the number one pick coil of the zero suppress relay, or if the zero suppress hub is connected and a zero appears in the column so as to energize the number two pick coil of the zero suppress relay. Notice that in the above example, the "0" would have printed column "b" even if the column "b" print hub 81b were not connected; however, had there been a zero in column "c," it would not print in this case. Printing of every zero, even to the left of any digit can be effected by connecting all of the print hubs 81; printing of every zero after a significant digit is effected by connecting all of the print hubs 81 except in column "a" (81a). Two separate composite numbers, for instance, 0010/0329, with every-zero printing in the first group, and significant-zero printing in the second group can be effected by connecting the print hubs 81a, 81b, 81c and not connecting 81d. Thus, in this example, the first two non-significant zeros can print, but the zero in column "e" (preceding the "3") is suppressed since the hub 81d is open and RDP2 cannot be energized by the "0" pulse in column "d."

Note that zero suppression is not essential to random printing, or cycle point conversion, but is presented here only as a feature of this embodiment.

Returning to Fig. 5, notice that a zero is stored in the column "f" delay unit until Q-time of the first print cycle, and that a "9" reads in at 9-time of the second read cycle, which is just prior to P-time of the first print cycle; the zero pawl 27–0 is rotated at 0-time of the first read cycle, and revolves toward the readout contacts, during which time a "9" is read (in the subsequent cycle) rotating the "9" pawl 27–9. There is no problem in having two rotated pawls revolving on the delay unit at the same time since the commutator 29 will sort the pulses by digit, and those pulses will reach the correct type bar magnet at the right time, as previously described. Therefore, it is not necessary to provide two delay units for push pull operation in each column. The delay units and commutators receive only digit pulses corresponding to holes punched in the cards, and since there is only one hole punched in each column of a correct card, provision need be made to receive only a single pulse during the read-in portion of each cycle. Should there be two digits punched in the card, the higher number would print first and the lower number would be superimposed on it, giving an indication of the error in the card. Since there is only one number per column per card, the zero suppress relays can only be energized once per cycle, and therefore they may be held in common to the end of the cycle, as before described. Fig. 5 illustrates the random printing time delays; for instance, the first card reads a "5" in columns "g" and "h" simultaneously, but print position 23h passes over the "5" type bar one print-time (M-time) after print position 23g (L-time), and so printing of the "5" in column "h" is one print-time later. Similarly, in the second card, print position 23d is over the "4" type bar at the same time that print position 23e is over the "5" type bar; there is one print-time delay per lower number and per lower column, and in this case a lower number in a higher column prints simultaneously with a higher number in a lower column.

*Brief description of end printer with electric cycle point conversion*

Another embodiment of this invention comprises separate functional units for cycle point conversion and delay, as shown in Fig. 6. It was previously mentioned that in order to get the proper spacing of end printed numbers, it was necessary to print the card at a faster rate than that at which the punched holes are sensed. In this embodiment the standard punched hole reading rate of 16 holes per cycle is maintained, and printing is effected at a rate corresponding to 20 subcycle points per cycle. The conversion from the lower reading frequency to the higher printing frequency is effected by storing the punched hole information briefly, and then reading it out of storage my means of pulses emitted on a 20-point basis. This 20-point storage output is fed into a rotary delay unit where it is given a fixed delay of two subcycles, or print-times, to account for card motion from the brush and roller area of a machine to the area where there is room to locate the type bars, and an additional fixed delay of one print-time in each successively lower ordered column to account for random printing.

In the embodiment shown in Fig. 6, the card feed, type bar assemblies, commutators and zero suppression are the same as in the device of Figs. 1 through 5, except that a printing frequency of 20-points instead of 21-points is arbitrarily contemplated. Pulses sensed by the brushes 24 are fed along lines 37 to respective "cycle point conversion" circuits 100, which are shown in the upper portion of Fig. 8 and described in detail in a later section. In the "cycle point conversion" circuits, each pulse directly operates relays which are set up in coded form to indicate the digit sensed, and the relays so operated later pass pulses at the printing frequency (here contemplated as being 20-points) onto lines 101 to operate the interposing magnet of "delay units" 102. The "delay units" 102 are continuously rotating and serve to delay any digit pulse at least two print-times, that is, two cycle points at the printing frequency, there being one additional print-time delay for each successively lower ordered column. After the required delay, the "delay units" pass pulses along lines 79 to rotors 30 of respective "commutators" 29. Each commutator output will be directed along the proper line 31 to join with the corresponding line 33 going to the correct one of the "type bars" to print the digit which was sensed in the card. The operation of this form of end printer differs from that of the end printer described hereinbefore (Figs. 1–5), in that the cycle point conversion is effected by relays and commutators, and the rotary delay units are used solely to provide a fixed delay in the pulses to accommodate the mechanical space difference between the brushes and the type bars, and to add one cycle point of delay for each lower order of the column in which the number will be printed.

*Non-converting delay device*

A rotary delay device similar to that shown in Fig. 3, but having all pawls of like shape, which is suitable for use in the modification of Fig. 6, is shown in Fig. 7. In this device there are ten identical pawls about the periphery of the delay unit. In order to effect the proper spacing of printed characters, printing is done on a 20 subcycle point basis; this frequency being twice the number of pawls on the drum permits disposing the pawls equally spaced around the drum and rotating the drum two revolutions in each machine cycle. This in turn permits the pawls to be larger and/or the drum to be smaller than those of Fig. 3, each of which is a mechanical improvement.

The delay units 102 comprise a hollow drum section 110 having nine flanges 111 spaced evenly along the length thereof, there being ten pivot rods 112 extending through all of the flanges 111, throughout the length of the delay unit 102; ten pawls 116 are disposed on the pivot rods 112 between pairs of flanges 111. The drum portion 110 has holes 113 through it to permit restoring fingers 115 and reset bearing ears 114 on the pawls to pass therethrough. The pawls 116 also have interposing faces 118 and switch operating arms 117 thereon. The pawls correspond to, and are arranged in the same order as the digits in the card; the pawl 27–0 corresponding to the digit "0" is shown at the top of the unit under the magnet, the others being arranged in ascending order clockwise around the unit. Above each delay unit is a magnet 120 having an armature 119 disposed so that when the magnet 120 is energized, the armature 119 will be lowered into a position to contact the interposing face 118 of any of the pawls 116 as they revolve thereunder. The pawl 116–0, which corresponds to the digit 0, is shown in the position in which contact would occur if the magnet were energized; when contact occurs, the relative motion of the pivot rod 112 revolving on the rotating delay unit, and the armature 119 cause the pawl to rotate counterclockwise into the position in which the "9" pawl 116–9 is shown. In the rotated position, the switch operating arm 117 extends radially from the flange portion 111 so as to rock the switch contact arm 121 as it revolves past said arm. The switch operating arms are disposed sequentially about the delay unit; the column "*a*" arm 121*a* being two pawl positions displaced from the armature 119 and therefore delayed two cycle points, or print-times, and the column "*h*" arm 121*h* being displaced 8 pawl positions from the armature. Shown within the delay unit drum is a reset blade 122 mounted on a fixed shaft member 123. The reset blade extends in common to all of the delay units and serves to contact the restoring finger 115 of any rotated pawl as the pawl revolves toward the armature 119 so as to reset (or re-rotate) the pawl into its inoperative position; the "9" pawl 116–9 is shown just prior to being reset by the blade 122. The reset blade ensures that no pawl will operate the switch arm 121 unless it is rotated by the armature 119 during the current machine cycle. The restoring finger 115 rests against the edge of the hole 113 in the drum 110 to limit the movement of the pawl 116 in the rotated position, and the reset bearing ear 114 similarly limits the pawl in the restored position.

In Fig. 7*a*, the shape of the pawls, which permits overlapping without interference is illustrated. The operation of the delay unit is identical with that of the embodiment shown in Fig. 3 and is described in detail in the following section.

*Operation and timing with electric cycle point conversion*

The details of the "cycle point conversion" circuits, and the overall operation of this embodiment will be described with reference to the schematic diagram in Fig. 8 and the timing diagram in Fig. 9, which are similar to Figs. 4 and 5, respectively.

Referring now to Fig. 8, a hole in the card 20 is sensed by a brush 24 as the card moves from left to right. The digit pulse passes along the line 37, through a hub 76, over control panel wiring, through a hub 77 and along a line 75, as in the prior embodiment. Instead of going directly to a delay unit, however, the pulse in this embodiment goes to a rotor 126 of a cycle point conversion commutator 125. The stator-segments of the commutator are connected in groups; the 9-stator, 6-stator and 3-stator are connected by a common line 129 to the coil of a relay RX; the 8-stator, 5-stator and 2-stator are connected by a common line 130 to the coil of another relay RY; the 7-stator, 4-stator and 1-stator are connected by a common line 131 to a relay RZ. When a digit pulse energizes a relay RX, it will be held on through its number one contact RX1 by a circuit breaker CBX which is energized from 9-time through 7-time, from 6-time through 4-time, and from 3-time through 1-time, as shown in Fig. 9. The relays RY and RZ are energized and held similarly by circuit breakers CBY and CBZ respectively. Shown at the center of Fig. 9 are "20 point emitter" pulses identified as numerals "9" through "0," which are coincident with "20-point print times" at the bottom of Fig. 9. The 20-point print times are identified with arbitrary letters and are related to the 20-point numerals by the fact that a "9" prints in column "*a*" at A-time, as in Fig. 5. The 20-point digit times 9, 8, . . . 0 represent the times that the corresponding stator-segments 9, 8, . . . 0 of an emitter 127 will be contacted by a continuously rotating rotor 128. The emitter stator-segments are connected in groups like those of the commutator; the "9," "6" and "3" stators are connected by a common line 136 to the X-relay number two contact RX2, the "8," "5" and "2" stators are connected by a line 137 to RY2, and the "7," "4" and "1" stators are connected by a line 138 to RZ2.

Operation of the cycle point conversion circuits is best described by taking an example, for which the "first card" of Fig. 9, having the number "90732055" punched therein will be considered.

The first hole sensed is the "9" in column "*a*." The 9-pulse is sensed and enters the rotor 126*a* at 16-point 9-time (top of Fig. 9); the rotor is then passing the 9-stator of the commutator 125*a*, and the pulse is passed over the 9-wire and the common wire 129*a* to the coil of relay RX*a*. RX*a* is thus energized at 9-time, and since CBX is closed from 9-time through 7-time, the relay RX*a* will still be energized through its number one contact RX*a*1 when the rotor 128*a* passes the 9-stator of the emitter 127*a*, which is the "20-point emitter" time (Fig. 9) identified by a "9." The 20-point 9-pulse passes over the 9-line and the common line 136 through the number two relay contact RX*a*2, and thence over a line 135*a* to the magnet 120*a* of the delay unit 102*a*, causing the armature 119*a* to rotate the pawl 116*a*; this is shown as the first pulse in the column "*a*" portion of the "delay units" illustration of Fig. 9. The pawl 116*a* revolves toward the switch rocker arm 121*a* during the time indicated by the lightly dashed portion of the column "*a*" illustration in Fig. 9; the readout contact 139*a* is closed at A-time, which is shown by the final pulse in the column "*a*" line of the chart. A 20-point circuit breaker 140 sends pulses over a line 141 to all of the readout contacts 139. When the readout contact 139*a* is closed, it passes the pulse over a line 79*a* to the readout commutator 29*a* and the zero suppress relay coil RAP1 as in the before-described embodiment. Returning to the emitter 127*a*, after the rotor 128*a* passes the 9-stator, it passes the 8, 7, . . . 2, 1 and 0 in succession. Since relays RY*a* and RZ*a* have not been energized by a digit pulse from the card, no pulses on the common lines 137*a* or 138*a* can pass therethrough. The circuit breaker CBX opens at the end of 16-point 7-time, so that the 20 point emitter 127*a* cannot pass pulses therethrough after approximately the start of 20-point 8-time. Thus, the "6" and the "3" will not falsely operate the delay unit. Just after the "9" is passed from the emitter 127*a* to the delay unit 102$a$, a "7" is sensed in column "$c$," and thereafter, a "5" is sensed in columns "$g$" and "$h$." Since there is only one hole in each card column, none of the relays in column "$h$" were energized before 16-point 5-time. The 5-hole in the card is sensed at the time that the rotor 126$h$ passes the 5-stator of the commutator 125$h$. The 5-pulse is thereby passed over the 5-wire and the common wire 130$h$ to the coil of relay RY$h$, which serves the digits "8," "5" and "2." RY$h$ is energized at 16-point 5-time and remains on through 16-point 3-time, during which the rotor 128$h$ passes the 6-stator of the commutator 127$h$, which sends a 20-point 6-pulse over the 6-wire and the common line 136$h$ to the contact RX$h$2; RX$h$ has not been energized, so RX$h$2 is open and the pulse cannot pass. The rotor 128$h$ then passes the 5-stator and sends a pulse over the 5-line and the common line 137$h$ to the number two contact of relay RY$h$, which is still closed. The pulse is thus passed onto line 135$h$ to the delay unit 102$h$, as before described. The next pulses sensed in order are the "3" in column "$d$," the "2" in column "$e$" and the "0's" in columns "$b$" and "$f$." The more rapidly occurring pulses (20-point) are aligned in time with the slower pulses (16-point) by having the "0's" coincident; it is not necessary, therefore, to provide a delayed indication of a "0" having been sensed. The "0" in column "$b$" is passed directly through the 0-stator of commutator 125$b$, along the wire 135$b$ to the delay unit 102$b$. At 20-point 0-time, the armature 119$b$ rotates the pawl 116–0 on the delay unit 102$b$, which revolves through three positions (shown as the light dashed lines in the column "$b$" line in Fig. 9) before closing the readout contacts 139$b$ at L-time. The readout contact 139$b$ sends a pulse to the rotor 30$b$ which is then passing the 0-stator of the readout commutator 129$b$. The pulse then passes through the 0-contact of the column "$a$" zero suppress relay RA which was energized at A-time by the 9-pulse previously described, and held until S-time by the hold coil RAH through the hold circuit breaker CBH, as in the before-described embodiment. The zero suppress circuit breakers and relays CBE, . . . CBH, . . . RG are shown in Fig. 9 only to relate their timing to the 20-point basis; the timing relative to particular print times is the same as in the before-described embodiment.

The delay unit readout arms must all be disposed on the delay unit in advance of the magnet. In Figs. 3 and 4, the contacts are $\frac{1}{21}$ revolution apart, which allows up to $\frac{12}{21}$ revolution fixed delay. The device of Figs. 7 and 8 rotates twice per machine cycle, so the contacts must be $\frac{1}{10}$ revolution apart for a 20-point readout rate. With eight contacts (one per column) there is only $\frac{2}{10}$ revolution fixed delay allowable. The lesser fixed delay in this embodiment results in printing the card closer to reading time, and the printed numerals are therefore clustered near the nine edge of the card instead of the center of the card as in the first embodiment, as shown by the relative card position at the top of Figs. 4 and 8. This lesser delay, and the fact that the cycle point conversion delay occurs before delay unit entry, result in only one entry per delay unit per cycle as shown by the column "$f$" delay unit line in Fig. 9.

*Interpreting*

In the data processing art, "interpreting" usually means both printing a record card according to the data manifested therein generally. Interpreting also means the particular case of printing a record card on a line parallel to the long dimension of a record card, as distinguished from "end-printing."

In the random printer described herein, the type is arranged in a row parallel to card motion, and printing occurs when a print position passes over a type bar bearing the character to be printed thereon; the time of printing is one print-time later per lower digit, and one additional print-time later per lower column.

In the end-printing embodiment of the random printer, described herein because the time concepts involved are more easily understood than in an interpreter of similar design, the data is sensed row by row in the several columns simultaneously; the later time per digit is provided by sensing the digits in sequence, while the later time per column is provided by the successively increased delay in the delay units of successively lower columns.

In order to print parallel to the long dimension of the card, the card would be fed short edge first, resulting in all index points of a single column being sensed simultaneously, column by column. When feeding the card short edge first for interpreting, the later print time for subsequent columns is provided by the later times at which each column is sensed, whereas the later time per subsequent digit is provided by the successively increased delay in delay units corresponding to successively lower digit values.

It is therefore apparent that the random printer embodiments herein are equally suitable for interpreting as for end-printing, with minor modifications. The card feed must be able to accommodate the narrow dimension of the card, and there needs to be a channel of mechanism (eight of which are arranged by columns in the end-printing embodiment) for each of the index point rows in the cards, which are scanned simultaneously, column by column. For example, a well known IBM card, previously described, may be fed face down, column "1" end (left end) first. In Fig. 1, the mechanism designated by the suffix "$a$" would relate to the "0" row of index points, that with the suffix "$b$" to the "1" row, that with the suffix "$c$" to the "2" row, . . . that with the suffix "$h$" to the "7" row, and two more groups of mechanism would be needed for the "8" and "9" rows; there would be maximum delay in the "0" channel, and minimum delay in the "9" channel. The pawls would respectively correspond to as many as ten columns of data; more pawls could be added to accommodate more columns. When interpreting, each delay unit corresponds to a digit, so that digital sorting of the pulses is not required, making the commutators unnecessary. Furthermore, since the different columns may cause energization of each readout contact at different times, a sorting of pulses to different print magnets by the commutators according to the different times that respective column pawls cause delay unit readout results in sending pulses of the same digit value to different type bars; therefore, the commutators must be removed when interpreting.

*Summary*

The embodiments shown and described herein have been presented only as examples for clarification, and are not offered by way of limitation. Applicant has illustrated the problems of timing which attend random printing, and has described mechanism to overcome these and other similar timing problems.

The random printing principle is herein applied to both the end-printing and the interpreting of a record card. Along with devices for supplying random printing delay, are shown means for effecting cycle point conversion, which means are of general utility, but which have been applied to printing by way of example.

Following the teaching of this disclosure, numerous random printing or time conversion requirements may be supplied; ratios between a data presentation frequency and a utilization frequency may be increased or decreased, mechanically or electrically in printing or in other environments; random printing may be effected with or without cycle point adjustment; and any of the above may be provided with versatile zero suppression.

The design of cycle point conversion and/or random delay devices depends on many factors. The number of cycle points in the output will depend on the spacing of whatever effect is to occur in response to the data pulses. A cycle point converting device with various shaped pawls is more expensive in small lots than one with all pawls alike, but requires less mechanism; a large quantity of devices could be most efficiently produced in a design similar to Fig. 3. If a rugged, compact unit is required, the device of Fig. 7 could be fitted with variably shaped pawls similar to those on the device of Fig. 3. If a mechanical cycle point converting device with all pawls alike is used together with switch-rocking mechanism, it may be helpful to have the pawls on different delay units staggered with respect to other units, to have the magnets correspondingly staggered, and to align all of the read-out contacts, in order to simplify the rocking mechanism but preserve the random timing thereof.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a data processing machine in which different data designations are manifested at respective ones of a sequence of times within a machine cycle at regular intervals, the combination of a plurality of delay elements, each respectively corresponding to one of said data designations, each of said elements having a different delay characteristic; means responsive to said data designations to operate said delay elements; means to cyclically present each of said delay elements in the sequence of said respective times, and means responsive to the data outputs of said delay means, whereby data are received by said last-named means at sequential times in said sequence at intervals determined by said delay unit characteristics.

2. In a data processing machine in which different data designations are sequentially presented in corresponding portions of a machine cycle, the combination of a group of delay elements, each having a different delay characteristic; means responsive to said data designations to activate said delay elements; means to condition each delay element for response to said activating means once each machine cycle, said group being effective to receive data designations in a plurality of said delay elements per cycle; and means to distribute the delayed data designations according to the respective times of occurrence thereof.

3. In a data processing machine of the type in which data designations are manifested in corresponding ones of a plurality of regularly recurring times in a machine cycle, a frequency converting storage device comprising a group of storage elements having different delay characteristics, input means to enter data into said storage elements, means to cyclically condition each of said group of storage elements to be responsive to said input means successively in a timed sequence, different ones of said storage elements being selected to store different data designations according to the time of entry of said data by said input means, said group operable to receive data in more than one storage element per cycle, and distribution means for sorting the data output from said group of storage elements according to the designation thereof.

4. In a data processing machine in which different data designations are manifested at corresponding ones of a sequence of times recurring at regular intervals, the combination of a plurality of storage elements each corresponding to a different one of said data designations, means synchronous with said sequence of times for distributing data designations to correct ones of said storage elements, means for developing data manifestations at times recurring at more frequent regular intervals, and means rendered effective by said storage elements to translate selected ones of said manifestations corresponding to said data designations.

5. In a data processing machine in which different data designations are manifested at respective ones of a sequence of regularly recurring times, the combination of a plurality of means for storing said data designations, different ones of said means corresponding to different data designations; means synchronous with the respective times of said data designations to distribute said designations to corresponding ones of said storage means; and means rendered effective by said storage means for emitting data corresponding to the data stored in said storage means at times recurring more rapidly than said sequence of times, to thereby effect conversion of data at a first frequency to like data at a higher frequency.

6. In a data processing machine, a cycle point converting device comprising a continuously rotating drum, a magnet disposed near the periphery of said drum having an armature oriented so as to extend toward said drum when said magnet is energized, switch means disposed adjacent to the periphery of said drum at a point displaced from said magnet, a plurality of differently shaped pawls, each disposed for rotation on one of a plurality of pivots arranged around the periphery of said drum, the axes of said pivots being parallel to the axis of said drum, an extended member on each of said pawls for contacting said armature when said magnet is energized, said contact serving to rotate the pawls as said pawls revolve with said drum, a projection on each pawl for closing said switch means when said pawls revolve past said switch means after rotation by said armature, said extended members and said projections being differently spaced on different pawls, means to selectively translate data on a first cycle point basis to said magnet, and means to receive the differentially stored data on a second cycle point basis.

7. In a data processing machine in which different data designations are manifested at respective ones of a sequence of regularly recurring times, the combination of a magnet responsive to said data designations having a displaceable armature; data utilization means; switch means for selectively energizing said data utilization means; a sequence of differently shaped rotatable pawls respectively corresponding to each of said data designations; and cyclic means for sequentially moving each of said pawls past said armature at the one of said sequence of times at which the respectively corresponding data designation may be effective to operate said magnet, said means thereafter moving the sequence of pawls past said switch means, the shape of said pawls and the position of said armature when displaced being effective to rotate select ones of said pawls in response to corresponding data designations, said switch means being disposed for contact by rotated ones of said pawls, said pawls being shaped so as to close said switch means when in contact therewith.

8. In a cyclical data processing machine in which different data designations appear at respective times occurring sequentially in each machine cycle, the combination of a storage means; a data receiving means for said storage means, said data receiving means being adapted to respond to a data designation to enter a corresponding item of data into said storage means, said storage means being adapted to issue a corresponding output signal after a definite delay from the time at which said receiving means enters said corresponding item of data into said storage means, the delay being progressively different in dependence upon the sequential time of the data designation; and means responsive to said storage means for translating the output signal therefrom.

9. In a cyclical data processing machine in which signals representing different data characters appear at respective times occurring sequentially in each machine cycle, the combination of a plurality of storage means arranged in a sequence; a plurality of data receiving means, one for each of said storage means, each of said data receiving means being adapted to respond to a data representing signal to enter a corresponding item of data into its related storage means, each of said storage means being adapted to issue a corresponding output signal after a definite delay from the time at which its respective data receiving means enters said corresponding item of data into said storage means, the delay being progressively different in dependence upon the sequential position of the related data receiving means and additionally progressively different in dependence upon the sequential time of the data signal; and means responsive to said storage means for translating the output signal therefrom.

10. A machine controlled by a record card having a sequence of data columns each of which is subdivided into index point positions of different data significance in another sequence; the index point positions of like data significance being arranged in rows perpendicular to said columns; comprising means to feed said card at a uniform rate parallel to one of said sequences; a sequence of means to sense the data manifested in said record card, said means being arranged in a line perpendicular to the motion of the card; a plurality of individually operable printing means, one for each of said rows, each of said means representing the data significance of the respective row, said printing means being arranged in a line parallel to the motion of the card in the same sequence as said rows; a plurality of storage means each responsive to a corresponding one of said sensing means, each of said storage means being adapted to issue a data manifestation after a definite delay from the time of responding to said sensing means, the delay being different in each of said storage means; and means responsive to the data manifestations issued by said storage means for selectively operating said printing means.

11. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to said columns; a sequence of means to sense the data manifested in said record card row by row; a plurality of individually operable printing means, one for each of said rows, each of said means representing the data significance of the respective row, said printing means being arranged along the path of card motion in the same sequence as said rows; individual means controlled by respective ones of said sensing means to delay the data manifestations sensed by said sensing means, each delay means having a different inherent delay; means responsive to the data manifestation issuing from any of said delay means for operating respectively corresponding ones of said printing means; and means for distributing the outputs of said delay means according to data significance to the correct ones of said responsive means to thereby effect printing of characters corresponding to the data manifested in the record card at a time determined by the one of said columns in which the data was sensed.

12. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence of means to sense the data manifested in said record card, said means being arranged in a line perpendicular to the motion of the card; a plurality of individually operable printing means, one for each of said rows, each of said means representing the data significance of the respective row, said printing means being arranged along the path of card motion in the same sequence as said rows; means to delay by differential amounts the data sensed by each of said sensing means, there being a successively increased delay for data sensed by successive ones of said sequential row of data sensing means; and a plurality of means controlled by said delay means to individually operate corresponding ones of said printing means to record the data issued from said delay means.

13. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to said columns; a sequence of means to sense the data manifested in respective columns of said record card row by row; a plurality of individually operable printing means, one for each of said rows, each of said means representing the data significance of the respective row, said printing means being arranged along the path of card motion in the same sequence as said rows; means to delay the data sensed by successive ones of said sensing means by successively greater amounts; and means to distribute the delayed data manifestations issuing from any of said delay means according to data significance to corresponding ones of said printing means.

14. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence of means to sense the data manifested in said record card, said means being arranged in a line perpendicular to the motion of the card; a plurality of individually operable printing means, one for each of said rows, each of said means representing the data significance of the respective row, said printing means being arranged along the path of card motion in the same sequence of said rows; means to delay the data sensed by said sensing means successively increased amounts for each means successively lower in the sequential row of said data sensing means, and additional successively different amounts for data successively lower in the sequence of data values; means to individually operate said printing elements; and means to distribute the data output from said delay means to different ones of said printing elements selectively according to the time of appearance of said data output as determined by the index point sensed and the column in which it was sensed.

15. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence of means to sense the data manifested in said record card, said means being arranged in a line perpendicular to the motion of the card; a plurality of individually operable printing means, one for each of said rows, each of said means representing the data significance of the respective row, said printing means being arranged along the path of card motion in the same sequence as said rows; a plurality of delay means having different delay characteristics, there being one of said delay means responsive to each of said sensing means for delaying the data sensed thereby, said delay characteristics comprising a successively greater delay in delay means corresponding to successive ones of said line of sensing means and an additional delay difference determined by the data designations sensed by the corresponding sensing means; and means for operating said printing means according to the data manifestations issued from said delay means.

16. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to said columns; a sequence of means to sense the data manifested in respective columns of said record card row by row; a plurality of individually operable printing means, one for each of said rows, each of said means representing the data significance of the respective row, said printing means being arranged along the path of card motion in the same sequence as said rows; means to delay the data sensed by each of said sensing means a different amount, said delay being greater in means corresponding to successive ones of said data columns and successively different for data of subsequent significance; and means synchronous with said delay means for distributing data of different significance to the correct different ones of said printing means, in the data sequence, at times determined by said delay means.

17. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence of means to sense the data manifested in said record card, said means being arranged in a line perpendicular to the motion of the card; a plurality of individually operable printing means, one for each of said rows, each of said means representing the data significance of the respective row, said printing means being arranged along the path of card motion in the same sequence as said rows; a plurality of storage means arranged in a sequence; a plurality of data receiving means, one for each of said storage means, each of said data receiving means being adapted to respond to one of said sensing means to enter a corresponding item of data into its related storage means, each of said storage means being adapted to issue an output signal after a definite delay from the time of receiving an entry from its respective data receiving means, there being a progressively greater delay in dependence upon the sequential position of the related data sensing means and an additional delay in dependence upon the sequential time of sensing the data designation; and means responsive to said storage means for translating the different output signals therefrom to different ones of said printing means respectively corresponding to the data significance of said output signals.

18. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to said columns; a sequence of means to sense the data manifested in respective columns of said record card row by row; a plurality of individually operable printing means, one for each of said rows, each of said means representing the data significance of the respective row, said printing means being arranged along the path of card motion in the same sequence as said rows; a plurality of storage means arranged in a sequence; a plurality of data receiving means, one for each of said storage means, each of said data receiving means being adapted to respond to one of said sensing means to enter an item of data corresponding to one of said rows into its related storage means, each of said storage means being adapted to issue an output signal after a definite delay from the time of receiving an entry from its respective data receiving means, the delay being progressively greater in dependence upon the sequential position of the related column and additionally in dependence upon the row in which the data was sensed; and means responsive to said storage means for translating the output signals therefrom to the printing means corresponding to the row in which the data was sensed.

19. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to one of said sequences; a sequence means to sense the data manifested in said record card, said means being arranged in a line perpendicular to the motion of the card whereby different data designations are sensed at different ones of a sequence of times recurring at regular intervals; a plurality of individually operable printing means, one for each of said rows, each of said means representing the data significance of the respective row, said printing means being arranged along the path of card motion in the same sequence as said rows; a group of storage elements for each sensing means, each element thereof corresponding to different ones of said data designations; means synchronous with said sequence of times for distributing said data designations to correct ones of said storage elements; means for developing data manifestations at times recurring at more frequent regular intervals; a plurality of data receiving means, one for each group of storage elements; a plurality of means each rendered effective by one of said storage element groups to translate selected ones of said manifestations corresponding to said data designations to the respectively corresponding one of said data receiving means; a plurality of delay means; one for each of said data receiving means, each of said data receiving means being adapted to respond to one of said data manifestations to enter a corresponding item of data into its related delay means, each of said delay means being adapted to issue an output signal after a definite delay from the time of receiving an entry from its respective data receiving means, the delay being progressively greater in dependence upon the sequential position of the related data receiving means; and means responsive to said delay means for translating the different output signals therefrom to different ones of said printing means respectively corresponding to the data significance of said output signals.

20. A machine controlled by a record card having a sequence of data columns each of which is subdivided into index point positions of different data significance in another sequence, the index point positions of like data significance being arranged in rows perpendicular to said columns; comprising means to feed said card at a uniform rate parallel to said columns; a sequence of means to sense the data designations in each column of said record card row by row in a sequence of times at regular intervals; a plurality of individually operable printing means, one for each of said rows, each of said means representing the data significance of the respective row, said printing means being arranged along the path of card motion in the same sequence as said rows; a group of storage elements for each column, each element thereof corresponding to different ones of said rows; means synchronous with said sequence of times for distributing said data designations to correct ones of said storage elements; means for developing data manifestations at times recurring at more frequent regular intervals; a plurality of data receiving means, one for each of said columns; a plurality of means each controlled by a corresponding one of said groups of storage elements for translating select ones of said manifestations to corresponding ones of said data receiving means; a delay means for each of said columns, each of said data receiving means being adapted to respond to one of said data manifestations to enter a corresponding item of data into its related delay means, each of said delay means being adapted to issue an output signal after a definite delay from the time of receiving an entry from its respective data receiving means, the delay being progressively greater in delay means related to successive ones of said columns; and means for distributing different ones of the manifestations emerging from any of said delay means to different ones of said printing means.

References Cited in the file of this patent

UNITED STATES PATENTS 2,811,102 Devol ---------------- Oct. 29, 1957